US012264530B2

(12) United States Patent
Wu et al.

(10) Patent No.: US 12,264,530 B2
(45) Date of Patent: Apr. 1, 2025

(54) CLOSURE SYSTEM AND METHOD THEREOF

(71) Applicant: CORNELLCOOKSON, LLC, Mountain Top, PA (US)

(72) Inventors: Zhizhou Wu, Tempe, AZ (US); Xin Cui, Tempe, AZ (US); Ryan Carroll, Phoenix, AZ (US)

(73) Assignee: CORNELLCOOKSON, LLC, Mountain Top, PA (US)

( * ) Notice: Subject to any disclaimer, the term of this patent is extended or adjusted under 35 U.S.C. 154(b) by 459 days.

(21) Appl. No.: 17/547,951

(22) Filed: Dec. 10, 2021

(65) Prior Publication Data

US 2022/0098918 A1 Mar. 31, 2022

Related U.S. Application Data

(63) Continuation of application No. PCT/US2020/037273, filed on Jun. 11, 2020.

(60) Provisional application No. 62/860,170, filed on Jun. 11, 2019.

(51) Int. Cl.
*E05F 15/77* (2015.01)
*E06B 9/68* (2006.01)

(52) U.S. Cl.
CPC ................ *E05F 15/77* (2015.01); *E06B 9/68* (2013.01); *E05Y 2400/42* (2013.01); *E05Y 2400/452* (2013.01); *E05Y 2400/66* (2013.01); *E05Y 2900/11* (2013.01); *E05Y 2900/146* (2013.01); *E06B 2009/6809* (2013.01)

(58) Field of Classification Search
CPC .... E05F 15/77; E06B 9/68; E06B 2009/6809; E05Y 2400/42; E05Y 2400/452; E05Y 2400/66; E05Y 2900/11; E05Y 2900/146
See application file for complete search history.

(56) References Cited

U.S. PATENT DOCUMENTS

2005/0017663 A1* 1/2005 Anderson ................ G05B 9/02 340/635
2005/0195066 A1 9/2005 Vandrunen et al.
2006/0109079 A1* 5/2006 Mack ................ G07C 9/00309 340/5.71
2008/0315988 A1 12/2008 Sikora et al.
2017/0332259 A1 11/2017 Hirayama et al.
(Continued)

FOREIGN PATENT DOCUMENTS

WO 2018145852 A1 8/2018

OTHER PUBLICATIONS

Canadian Office Action mailed in corresponding CA Patent Application No. 3,141,623 on Jan. 12, 2023, 4 pages.
(Continued)

*Primary Examiner* — Ryan W Sherwin

(57) ABSTRACT

A closure system including a curtain configured to seal an opening, a wireless network having a plurality of channels, at least one transmitter coupled to the curtain and configured to communicate over the plurality of channels, and an operator operatively coupled to the curtain and configured to communicate over the plurality of channels, the operator and the at least one transmitter configured to communicate with each other over a selected one of the plurality of channels based upon communication interference detected on one or more channels.

16 Claims, 8 Drawing Sheets

(56) References Cited

U.S. PATENT DOCUMENTS

| | | | | |
|---|---|---|---|---|
| 2018/0216389 | A1* | 8/2018 | Tsui | E05F 15/40 |
| 2018/0309619 | A1 | 10/2018 | Hall et al. | |

OTHER PUBLICATIONS

International Search Report mailed Oct. 28, 2020 for International Patent Application No. PCT/US2020/037273.
Written Opinion mailed Oct. 28, 2020 for International Patent Application No. PCT/US2020/037273.

* cited by examiner

CLOSURE SYSTEM AND METHOD THEREOF

CROSS-REFERENCE TO RELATED APPLICATIONS

This application claims priority to International PCT Patent Application No. PCT/US2020/037273, filed Jun. 11, 2020 entitled "Closure System and Method Thereof', which claims the benefit of U.S. Provisional Patent Application No. 62/860,170 filed Jun. 11, 2019 entitled "Closure System and Method Thereof", each of which is incorporated by reference herein in its entirety.

FIELD OF THE INVENTION

The present invention generally relates to a closure system and method thereof, and more particularly, the use of sensors to transmit signals to a curtain controller/operator that trigger operating events of the curtain and minimize power consumption.

BACKGROUND OF THE INVENTION

Mechanisms to control the opening and closing of rolling curtains or shutters have been in use for several years. Similarly, wireless networks and devices have become prevalent in everyday life. Wireless transmitters are useful when positioned on rolling curtains to trigger operating conditions of the curtain. Wireless transmitters, however, can consume battery life quickly when, for example, those transmitters frequently switch from channel to channel such as when multiple wireless networks are present. For example, external wireless devices may communicate with each other on a wireless network adjacent to the operator and transmitter. The presence of external devices communicating on a wireless network adjacent to the receiver and transmitter may result in interference on specific channels of communication between the receiver and transmitter. Further, current technologies do not efficiently detect new channels based on communication interference. For example, current technologies operate on a fixed channel determined once the device is powered on, and uses this fixed channel during the entire power cycle. Therefore, these current technologies do not change communication channels when a communication interference is detected. In another example, current technologies have less retry requests required to trigger a channel detection resulting in switching channels when there is only a short interference, such as an intermittent WiFi signal. This manner of constant switching channels due to short interferences results in an increase in power consumption.

Further, current technologies do not allow for easy pairing of devices. For example, current technologies require a user to enable pairing mode on both a transmitter and receiver within a short duration by manually pressing a button on both devices requiring pairing. This can result in multiple attempts being needed to pair devices, expending effort and time.

Current technologies also do not utilize efficient power saving modes based on the status of the rolling curtain or the type of device being used with the rolling curtain. For example, current technologies expend a significant amount of power in monitoring the status of the curtain or in monitoring the status of a device in use with the curtain. This can result in unnecessary draining of power levels, reducing the life span of the device's power source.

Accordingly, there is a need for a more efficient method of preserving the life of battery when communicating between a receiver and transmitter on a wireless network. Further, there is a need for a better pairing method between wireless transmitters and receivers that does not require constant manual pressing of a button on both devices for pairing purposes. There is also a need for a more efficient power saving mode associated with monitoring of the curtain and device status.

BRIEF SUMMARY OF THE INVENTION

Embodiments of the present invention are directed to a closure system including a curtain configured to seal an opening, a wireless network having a plurality of channels, at least one transmitter coupled to the curtain and configured to communicate over the plurality of channels, and an operator, the operator operatively coupled to the curtain and communicatively coupled to a receiver, and the receiver configured to communicate over the plurality of channels, the receiver and the at least one transmitter configured to communicate with each other over a selected one of the plurality of channels based upon communication interference detected on one or more channels.

In some embodiments, the curtain is disposed between a first guide rail and a second guide rail.

In some embodiments, the receiver is configured to determine the selected one of the plurality of channels based on a predetermined amount of communication retries detected on one or more channels.

In some embodiments, the receiver is configured to receive a plurality of first communication retries associated with communication interference on a first channel of the plurality of channels and a plurality of second communication retries associated with communication interference on a second communication channel of the plurality of channels. The receiver may be configured to compare the plurality of first communication retries on the first channel with the plurality of second communication retries on the second channel. The receiver and the at least one transmitter may determine the selected one of the plurality of channels based on the comparison of the plurality of first communication retries and the plurality of second communication retries.

In some embodiments, the at least one transmitter comprises at least one sensor.

In some embodiments, the communication interference originates from a wireless device external to the closure system. The communication interference may be a physical object disposed between the receiver and the at least one transmitter. The communication interference may be detected by the receiver.

In some embodiments, the operator is configured to control the operation of the curtain.

Another embodiment of the present invention may provide a method of sealing an opening comprising a curtain configured to seal the opening, the curtain controlled by an operator coupled to a receiver, the receiver configured to communicate with at least one transmitter on a wireless network having at least a first channel and a second channel, the method including the steps of receiving, via the receiver, a first signal from the at least one transmitter on the first channel, switching, via the receiver, from the first channel to the second channel when a wireless interference is detected by the operator on the first channel, receiving, via the receiver, a second signal from the at least one transmitter on the second channel, and moving, via the operator, the curtain based on the second signal.

In some embodiments, the switching from the first channel to a second channel includes the steps of determining a number of first communication retries associated with the first channel and a number of second communication retries associated with the second channel, comparing the number of first communication retries with the number of second communication retries, and communicating with the at least one transmitter on the second channel if the number of first communication retries is greater than the number of second communication retries by a predetermined amount of retries.

In some embodiments, the predetermined amount of retries is at least five retries.

Another embodiment of the present invention provides a method of switching a power mode of a transmitter coupled to a curtain, the transmitter configured to detect at least one obstacle and configured to communicate with a receiver, the method including the steps of receiving, via the receiver, a status of the curtain, transmitting, to the transmitter, the status of the curtain, selecting a power mode of the transmitter based on the status of the curtain, wherein the power mode is one of a power saving mode, a preparation mode, or a working mode, and transmitting, via the transmitter, to the receiver a signal at predetermined time intervals.

In some embodiments, the method further includes detecting the curtain being in a fully closed position, and based on the detection that the curtain is in the fully closed position, the transmitter selecting the power saving mode and ceasing detection of the at least one obstacle.

In some embodiments, the method further includes detecting the curtain being in a fully closed position, and based on the detection that the curtain is in the fully closed position, the transmitter selecting the working mode and ceasing detection of the at least one obstacle.

In some embodiments, the method further includes detecting the curtain being in an opening position, and based on the detection that the curtain is in the opening position, the transmitter selecting the power saving mode and ceasing detection of the at least one obstacle.

In some embodiments, the method further includes detecting the curtain being in a fully open position and a closing position, and based on the detection that the curtain is in the fully open position, the transmitter selecting the preparation mode and based on the detection that the curtain is in the closing position, the transmitter initiating detection of the at least one obstacle.

In some embodiments, the method further includes detecting the curtain being in a closing position, and based on the detection that the curtain is in the closing position, the transmitter selecting the working mode and continuously detecting a status of an edge of the curtain, wherein based on the detection of the at least one obstacle, the transmitter transmitting a message to the receiver indicating the detection of the at least one obstacle.

In some embodiments, the predetermined time intervals is between approximately 2 seconds and approximately 5 seconds.

In some embodiments, the signal indicates a battery level of the at least one transmitter.

In some embodiments, the method further includes receiving, via the receiver, the signal from the at least one transmitter.

Another embodiment of the present invention provides a method of pairing a receiver to a transmitter, the method including the steps of powering on the receiver, wherein upon the powering on of the receiver, the receiver enters a receiver pairing state for up to a first predetermined amount of time, powering on the transmitter and initiating a transmitter pairing state of the transmitter, wherein upon the initiating of the transmitter pairing state, the transmitter enters a transmitter pairing state for up to a second predetermined amount of time, wherein the transmitter and the receiver are paired within the first predetermined amount of time.

In some embodiment, the second predetermined amount of time being different than the first predetermined amount of time.

In some embodiment, the first predetermined amount of time is between approximately 2 seconds to approximately 7 seconds.

In some embodiment, the first predetermined amount of time is approximately 5 seconds.

In some embodiment, the second predetermined amount of time is between approximately 20 seconds to approximately 40 seconds.

In some embodiment, the second predetermined amount of time is approximately 30 seconds.

In some embodiments, the method further includes verifying that the receiver and the transmitter have been successfully paired, wherein upon successful pairing the transmitter exits the pairing state and the receiver exits the pairing state, and the transmitter initiates communication with the receiver.

Another embodiment of the present invention provides a method of pairing a receiver to a transmitter, the method including the steps of initiating a receiver pairing state of the receiver, wherein upon the initiating the receiver pairing state, the receiver enters a receiver pairing state for up to a predetermined amount of time, initiating a transmitter pairing state of the transmitter, wherein upon the initiating the transmitter pairing state, the transmitter enters a transmitter pairing state for up to the predetermined amount of time, wherein the transmitter and the receiver are paired within the predetermined amount of time.

In some embodiments, the predetermined amount of time is approximately 30 seconds.

In some embodiments, the method further includes verifying that the receiver and the transmitter have been successfully paired, wherein upon successful pairing the transmitter exits the transmitter pairing state and the receiver exits the receiver pairing state, and the transmitter initiates communication with the receiver.

BRIEF DESCRIPTION OF THE SEVERAL VIEWS OF THE DRAWINGS

The following detailed description of embodiments of the closure system and method thereof will be better understood when read in conjunction with the appended drawings of an exemplary embodiment. It should be understood, however, that the invention is not limited to the precise arrangements and instrumentalities shown.

DETAILED DESCRIPTION OF THE INVENTION

Exemplary embodiments of the present invention provide an improved closure system and method thereof. An embodiment is shown in FIGS. 1-8. In use, closure system 100 may be used to control the operation of a curtain to close and secure an enclosure. Closure system 100 may operate on a wireless network and communicate on various channels of the wireless network. Closure system 100 may further be configured to detect wireless communication interference on the various channels and selectively switch between communicating on the various channels.

Figure 1:
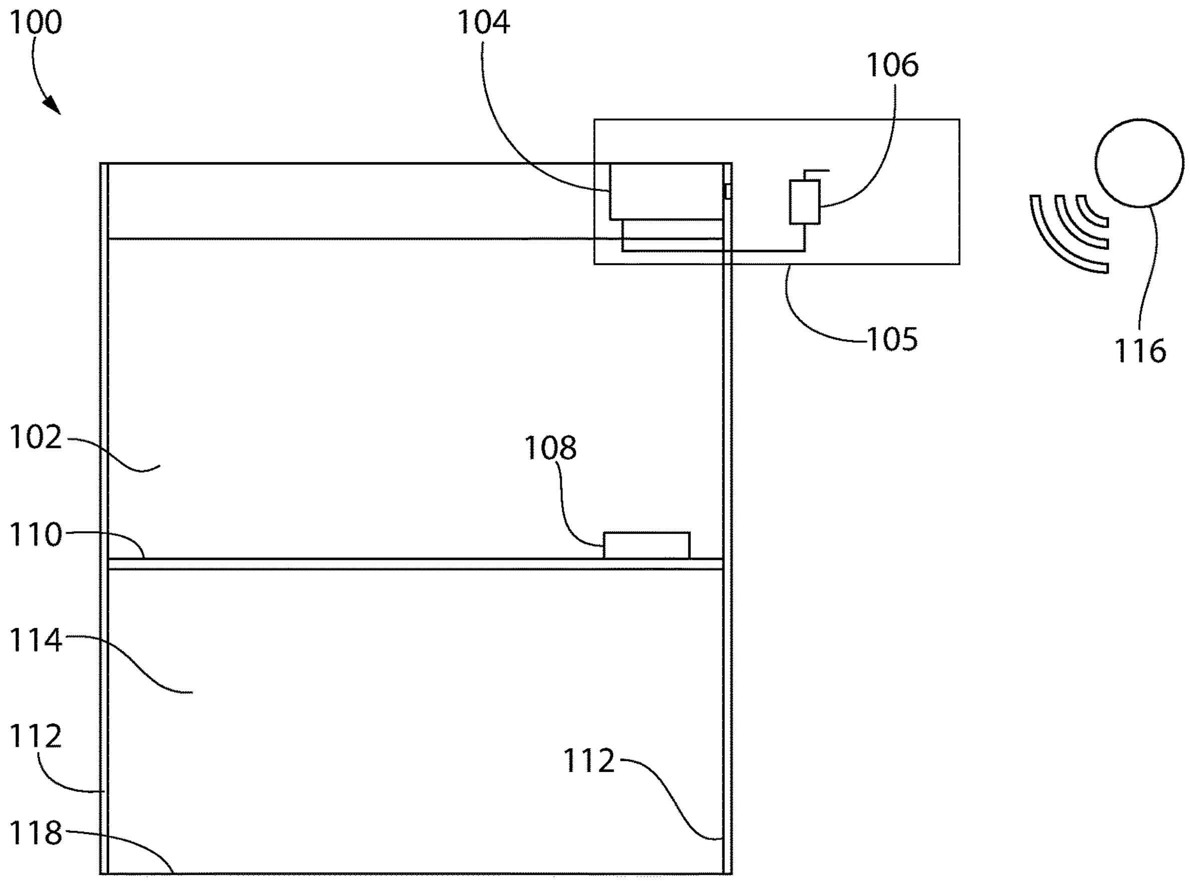
FIG. 1 illustrates an exemplary closure system in accordance with an exemplary embodiment of the present invention.

Referring to FIG. 1, closure system 100 may include curtain 102, operator 104, receiver 106, transmitter 108, curtain edge 110, curtain guides 112, opening 114, and wireless network 116. Curtain 102 may be used to close and seal opening 114. Curtain 102 may include curtain edge 110 and may be disposed between curtain guides 112. Curtain rails or guides 112 may include a first guide rail and a second guide rail, and curtain guides 112 may be coupled to curtain 102. Curtain edge 110 may be disposed on a boundary of curtain proximate to floor 118 of opening 114. Curtain guides 112 may be configured to guide curtain 102 during opening and closing of curtain 102 to seal opening 114.

Operator 104 may be operatively coupled to curtain 102 and may be configured to control the operation of curtain 102, such as the opening and closing of curtain 102 upon receiving commands from receiver 106. Operator 104 may be configured to provide a turning force to a counterbalance shaft of, for example, an overhead rolling steel curtain. Operator 104 may be communicatively coupled to receiver 106. In one embodiment, receiver 106 is coupled to operator 104 via a logic portion of operator 104. Receiver 106 is optionally disposed within operator 104. Receiver 106 may be configured to acquire the status (e.g., a signal representing the status) of curtain 102 from operator 104.

Receiver 106 may be communicatively coupled to one or more transmitters 108. For example, closure system 100 may include two, three, four, five, six, seven, eight, nine, ten, fifteen, or twenty transmitters 108. In some embodiments, closure system 100 may include between 1 and 300 transmitters 108. In one embodiment, closure system 100 includes 255 transmitters 108. Transmitter 108 may be disposed on curtain edge 110, or other locations on curtain 102 to provide, for example, critical safety data with respect to conditions of curtain 102. However, the one or more transmitters 108 may be disposed on any part of curtain 102 or in close proximity to curtain 102. Transmitters 108 may include a sensor and may be configured to communicate the status of curtain 102 or detection of obstacles (e.g., the communication may be of a signal representative of a curtain status or obstacle detection). For example, transmitter 108 may include safety devices, activation devices, detection devices, remote control devices, motion-sensing devices, light sensing devices, vehicle detecting devices, etc.

Transmitter 108 may include one or more of a power saving mode, a preparation mode, and a working mode. To limit energy consumption, transmitter 108 may be configured to switch between different ones of the modes depending on the status of curtain 102. The various power modes of transmitter 108 may be dependent on the function of transmitter 108 and may be triggered based on the status of curtain 102. When curtain 102 changes from an opened status to a closed status, different power modes of transmitter 108 may be triggered. For example, in one embodiment where transmitter 108 is a safety device, when curtain 102 is in a closed status the safety device may communicate less frequently with receiver 106, thereby enabling transmitter 108 to enter a power saving mode. When curtain 102 is in a closing status, the safety device may communicate more frequently with receiver 106 to ensure an object is not struck by curtain 102, resulting in transmitter 108 being in an active mode (a non-power saving mode). In one embodiment, the mode of transmitter 108 may be changeable independently of curtain 102 (e.g., the mode of transmitter 108 may be changed when the status of curtain 102 is not changing, thereby saving energy and battery life). In one embodiment, transmitter 108 is configured to change modes based upon instructions from receiver 106 to reduce unnecessary power consumption. For example, when curtain 102 is fully closed, transmitter 108 may enter power saving/sleep mode to save energy until curtain 102 is opened.

In one embodiment, closure system 100 includes a single receiver 106 communicating with all transmitters 108 associated with closure system 100. In other embodiments, multiple receivers are configured to communicate with operator 104 wherein each receiver communicates with one or more transmitters associated with closure system 100. In yet another embodiment, there may be only one receiver that communicates with one operator.

Transmitter 108 and receiver 106 may communicate through wireless network 116. Wireless network 116 may include a plurality of channels. Receiver 106 may communicate with the one or more transmitters 108 over a selected one of the plurality of channels of wireless network 116. In some embodiments, receiver 106 and transmitter 108 may communicate at preset intervals. For example, receiver 106 and transmitter 108 may communicate every one second, three seconds, five seconds, ten seconds, or any other amount of time desired. In some embodiments, receiver 106 and transmitter 108 communicate between every 1 and 60 seconds.

In one embodiment, closure system 100 may include controller 105. Controller 105 may include operator 104 and receiver 106. Controller 105 may be configured to communicate with transmitter 108 and may be configured to control the operation of curtain 102. Controller 105 may be configured to communicate with transmitter 108 via wireless network 116.

Figure 2:
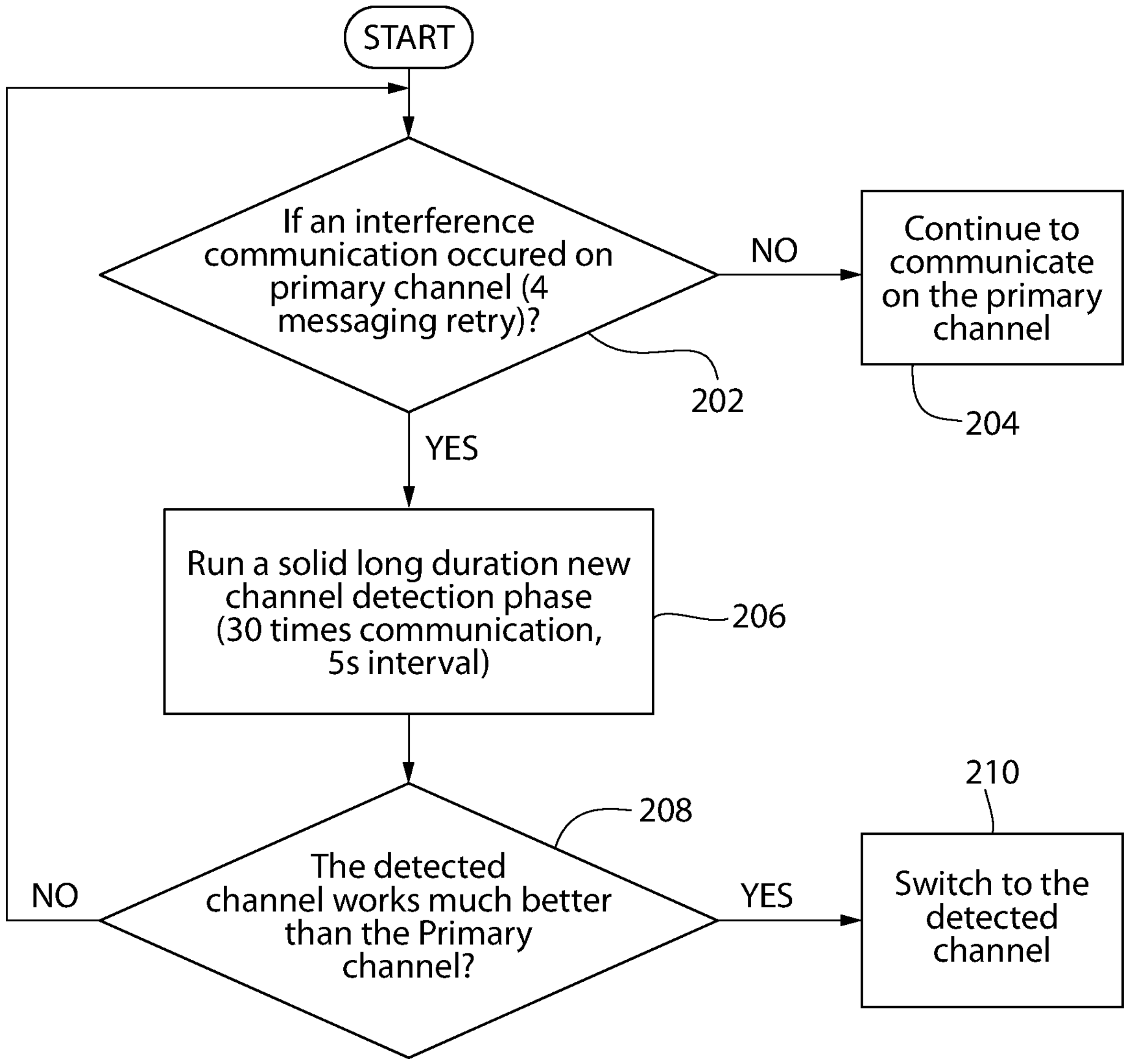
FIG. 2 illustrates an exemplary flow chart representing a method for detecting wireless communication interference in accordance with an exemplary embodiment of the present invention.

FIG. 2 illustrates a flow diagram of exemplary method 200 of the present invention. According to exemplary method 200 of the present invention, receiver 106 is configured to communicate with transmitter 108 over a selected channel of wireless network 116. In some instances, it becomes necessary for communication to move to a different channel based upon communication interference detected on the plurality of channels of wireless network 116. However, moving communication to a different channel requires significant power consumption. Therefore, moving communication to a different channel must be limited and must occur when necessary. It is important to avoid moving communication when there is only random interference that does not persist. In some embodiments, the basis for moving channels is the detection of interference on a plurality of channels for a predetermined amount of communication retries. For example, receiver 106 may initially communicate with transmitter 108 over a first selected channel of wireless network 116. When receiver 106 detects communication interferences on the first selected channel, receiver 106 may then preferentially communicate with transmitter 108 on a second selected channel after undergoing a new channel detection phase to determine whether, or the degree to which, communication interferences exists on the second selected channel. Receiver 106 may preferentially communicate on the second selected channel when a predetermined number of communication retries have been detected or exceeded due to the communication interferences on the first selected channel. Even if receiver 106 detects communications errors on a first channel, receiver 106 may retain communications over the first channel if communication interferences on the second channel are no better than those on the first channel. In some embodiments, switching or retaining channels is based up the difference between the level of communication interferences on the first channel and the second channel. For example, until a predetermined threshold improvement to the communication interference is detected on a second channel, receiver 106 may be configured to retain communications on the first channel. Communication interferences may occur due to an external wireless device communicating on the same frequency and channel as receiver 106 or due to a physical object interfering with the transmission of the signal between receiver 106 and transmitter 108.

As shown in step 202 of method 200, system 100 is configured to assess whether an interference communication occurred. For example, receiver 106 may determine if an error is received on the selected channel when receiver 106 is communicating with transmitter 108 through wireless network 116. Receiver 106 may be configured to receive an indication of a one or more communication errors associated with communication interference on the selected channel of the plurality of channels and one or more communication errors associated with communication interference on a new channel of the plurality of channels. Receiver 106 may detect a communication interference by receiving a communication error when communicating or attempting to communicate with transmitter 108. Receiver 106 may detect a communication interference by processing a communication retry request. For example, receiver 106 may attempt to transmit a signal to transmitter 108, but transmitter 108 may not receive the signal due to communication interference. In another example, transmitter 108 may attempt to transmit a signal to receiver 106, but receiver 106 may not receive the signal due to communication interference. Receiver 106 may be configured to retry the transmission of the signal to transmitter 108. Receiver 106 may be configured to attempt a preselected number of retries prior to entering a new channel detection phase. In one embodiment, the preselected number of retries must occur within a predetermined period of time. For example, receiver 106 may process the preselected number of retries within thirty seconds prior to entering a new channel detection phase. In another embodiment, the preselected number of retries must be consecutive. For example, receiver 106 may attempt to retry communication with transmitter 108 four consecutive times prior to entering the new channel detection phase. Receiver 106 may attempt any number of retries, such as one, two, three, five, six, seven, or eight retries. In some embodiments, the predetermined amount of time may be from approximately 5 seconds to approximately 60 seconds, approximately 10 seconds to approximately 45 seconds, or approximately 15 seconds to approximately 30 seconds.

As illustrated in FIG. 2, if receiver 106 is able to communicate with transmitter 108 in less attempts than the preselected number of retries at step 202, receiver 106 is configured to continue to communicate with transmitter 108 on the selected channel (step 204). For example, if receiver 106 is able to communicate with transmitter 108 after only three consecutive retries and the preselected number of retries is four, then receiver 106 will continue to communicate with transmitter 108 on the selected channel. If the number of retries is four or more and the preselected number of retries is four (step 202), then receiver 106 enters a new channel detection phase to determine another selected channel of wireless network 116 on which to communicate with transmitter 108 at step 206.

In a preferred embodiment, the preselected number of retries is four. Using four as the preselected number of retries can result in saving as much as 75% of the battery per communication of a message compared to switching channels after a single retry. Using four retries as the preselected number of retries ensures that closure system 100 does not enter the new channel detection phase based on only a short interference, thereby conserving power consumption. For example, if the preselected number of retries was one retry, then closure system 100 may prematurely and unnecessarily enter the new channel detection phase. This is because even a channel without interference can result in a single retry occurring. Entering the new channel detection phase prematurely may result in unnecessarily expending, for example, 10-15 minutes of battery life, as closure system 100 attempts to find a new channel, when a new channel is not required. Conversely, using a large number of retries for the preselected number of retries, such as ten, may result in a larger power consumption as closure system 100 may be constantly sending messages on a channel that has communication interference until ten retries have occurred, thus resulting in an increase in power consumption. For example, using a large number of retries, such as ten retries, may result in closure system 100 never entering new channel detection phase, resulting in greater power consumption. In using ten retries, for example, as the preselected number of retries, closure system 100 would never enter the new channel detection phase because ten retries would never occur on a channel, even if the channel experiences significant interference. Using a large number of retries would result in a large amount of power consumption as system 100 continues to send messages on a channel with significant interference, since system 100 would never enter new channel detection phase. In certain embodiments, using four as the preselected number of retries may result in reducing the power consumption by 75% or may result in saving up to 10 minutes of battery life. For example, remaining on a channel with interference to send a message usually results in four retries to be successful. Therefore, system 100 saves 75% of the power consumption by using four retries and successfully switching to a channel without interference.

At step 206, there is run a solid long duration new channel detection phase. At step 206, a preselected number of communications is attempted with both the original channel of communication and with the new channel of communication at a preselected amount of time on each channel. For example, the new channel detection phase of step 206 may require thirty communication attempts or communication retries with both the original channel and the new channel at preset intervals. For example, at step 206, receiver 106 and transmitter 108 may attempt to communicate thirty times on the original channel and the new channel every five seconds. However, the present interval may any amount of time desired, such as one second, two seconds, three seconds, or ten seconds. As shown in step 208, once the new channel detection phase has completed at step 206, receiver 106 may determine, based on the results of the new channel detection phase, which channel of wireless network 116 possesses the better communication performance. As shown in step 210, if the new channel possesses better communication performance than the original channel, communication switches to the new channel of wireless network 116 to communicate with transmitter 108.

Figure 3:
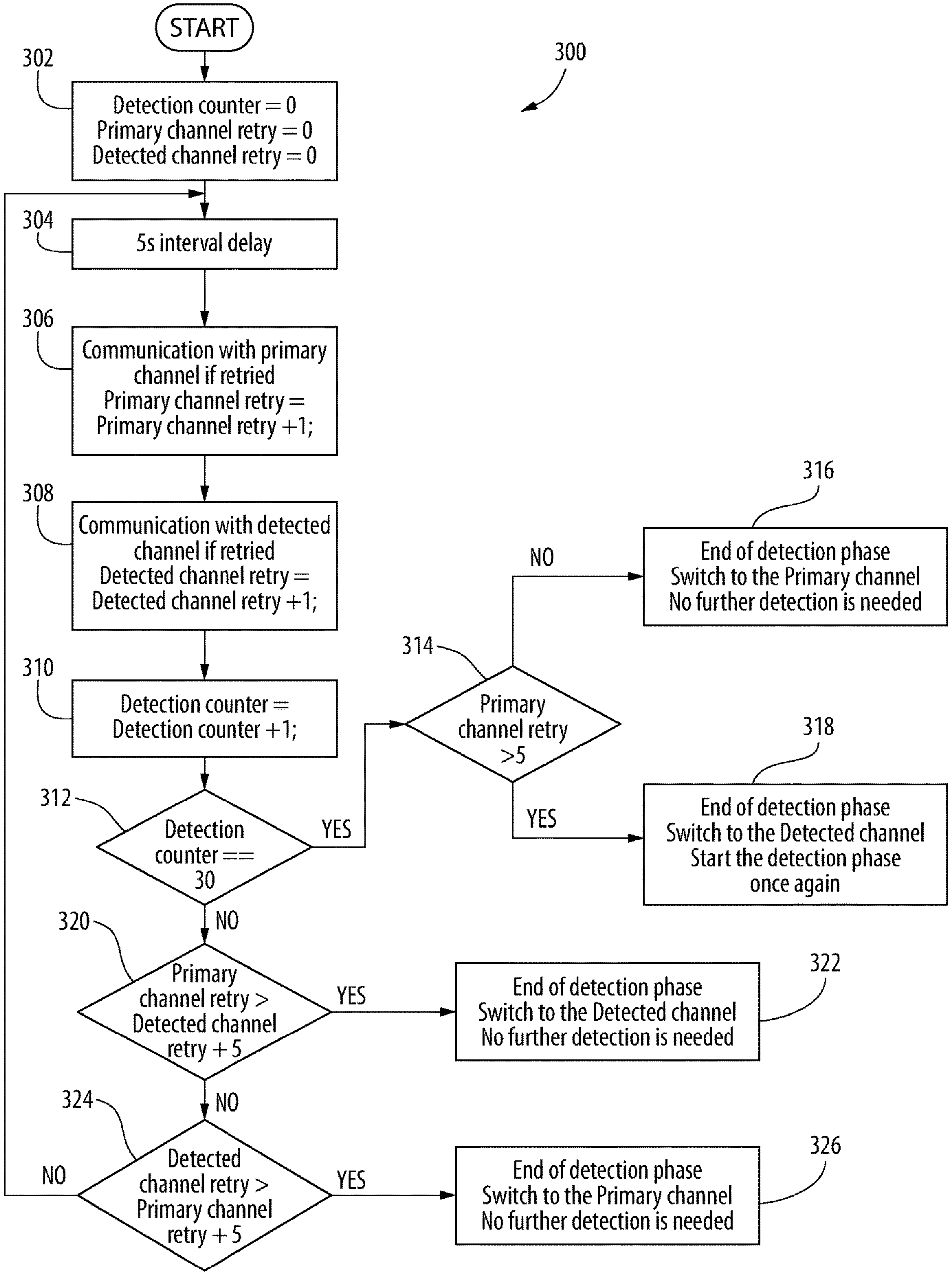
FIG. 3 illustrates an exemplary flow chart representing a method for detecting wireless communication interference in accordance with an exemplary embodiment of the present invention.

FIG. 3 illustrates a flow diagram of an exemplary new channel detection phase 300 shown in step 206 of method 200. New channel detection phase 300 may compare the communication retries on a primary channel (e.g., an original channel) with the communication retries on the detected channel (e.g., a potential new channel) that occur during a predetermined amount of communication cycles. As shown in FIG. 3, new channel detection phase 300 may communicate with the primary channel and the detected channel at preset intervals, such as five seconds. For example, receiver 106 and transmitter 108 may communicate on the primary channel, then the detected channel and then wait for five seconds, then communicate on the primary channel again and the detected channel again, and continue communicating for the predetermined amount of communication cycles. System 100 may exit new channel detection phase 300 and proceed to step 208 when: (i) the primary channel has more communication retries than the detected channel plus a predetermined amount of retries prior to reaching the predetermined amount of communication cycles, and system 100 switches to communicate on the detected channel; (ii) the detected channel has more than communication retries than the primary channel plus a predetermined amount of retries prior to reaching the predetermined amount of communication cycles and system 100 continues to communicate on the primary channel; or (iii) the predetermined amount of communication cycles has been reached and either (a) the primary channel has less than the predetermined amount of communication retries, and system 100 continues to communicate on primary channel or (b) the primary channel has more than the predetermined amount of communication retries and system 100 restarts new channel detection phase 300.

As shown in step 302, exemplary new channel detection phase 300 may include counters, which may be set to zero at the start of new channel detection phase 300. For example, as shown in step 302, new channel detection phase 300 may include a detection counter to count the number of communication cycles, a primary channel retry counter to count the number of communication retries on the primary channel, and a detected channel retry counter to count the number of communication retries on the detected. According to new channel detection phase 300, primary channel may be the channel of wireless network 116 that receiver 106 and transmitter 108 are currently communicating on and detected channel may be a new channel of wireless network 116 that receiver 106 and transmitter 108 are not currently communicating on. As shown in step 302, the detection counter, the primary channel retry counter, and the detected channel retry counter are set to zero.

As shown in step 304, the present interval is set to five seconds. However, the preset interval may be any amount of time desired. In step 306, receiver 106 and transmitter 108 may attempt to communicate over the primary channel of wireless network 116. If receiver 106 receives a communication error, in one embodiment, receiver 106 must retry the communication attempt over primary channel due to communication interference, then primary channel retry counter is increased by one due to the communication retry. If receiver 106 does not need to retry the communication attempt over primary channel, then primary channel retry counter is not increased. After receiver 106 and transmitter 108 attempt communication over the primary channel, receiver 106 may then attempt communication over detected channel of wireless network 116, as shown in step 308. If receiver 106 receives a communication error and must retry the communication attempt over detected channel due to communication interference, then detected channel retry counter is increased by one. If receiver 106 does not need to retry the communication attempt over detected channel, then detected channel retry counter is not increased. In step 310, once communication has been attempted on both the primary channel and the detected channel, as shown in steps 306 and 308 respectively, detection counter may be increased by one as one communication cycle has been completed. In step 312, if detection counter reaches the predetermined amount of communication cycles, then new channel detection phase 300 proceeds to step 314. The predetermined amount of communication cycles may be 10 to 30 cycles, 15 to 35 cycles, or 20 to 50 cycles. In a preferred embodiment, the predetermined amount of counts is approximately 30 cycles. For example, when detection counter reaches thirty cycles, then new channel detection phase 300 may proceed to step 314.

If the detection counter has not reached thirty cycles in step 312, then in step 320 it is determined whether the primary channel retry counter is greater than the detected channel retry counter by the predetermined amount of communication retries. The predetermined amount of communication retries may be five, six, seven, eight, nine, ten, fifteen, or twenty counts. In a preferred embodiment, the predetermined amount of communication retries is five. As shown in step 322, if primary channel retry counter is greater than the detected channel retry counter by a predetermined amount of communication retries, such as five communication retries, then new channel detection phase 300 may terminate, and receiver 106 and transmitter 108 may switch to communicating on the detected channel. However, if the primary channel retry counter is not greater than the detected channel retry counter by a predetermined amount of communication retries, then new channel detection phase 300 proceeds to step 324.

As shown in step 324, if detected channel retry counter is greater than the primary channel retry counter by the predetermined amount of communication retries, such as five counts, then new channel detection phase 300 may terminate, and receiver 106 and transmitter 108 may continue communicating on primary channel of wireless network 116. However, if the detected channel retry counter is not greater than the primary channel retry counter by the predetermined amount of communication retries, then new channel detection phase 300 loops back to step 304. New channel detection phase 300 may loop back to step 304 when, for example, primary channel retry counter and detected channel retry counter are less than the predetermined amount of communication retries and detection counter is less than the predetermined amount of communication cycles.

As shown in step 312, detection counter reaches thirty cycles when each of primary channel and detected channel have had thirty communication attempts and primary channel retry counter has not reached the detected channel retry counter plus the predetermined amount of communication retries, and the detected channel retry counter has not reached the primary channel retry counter plus the predetermined amount of communication retries. Once detection counter has reached thirty cycles, it may be determined if primary channel retry counter is greater than a predetermined number of communication retries. The predetermined number of communication retries may be from 5 to 10 communication retries, from 10 to 15 communication retries, from 15 to 20 communication retries, or from 20 to 25 communication retries. In a preferred embodiment, the predetermined amount of communication retries is five.

As shown in step 318, if primary channel retry counter is greater than the predetermined number of communication retries, then new channel detection phase 300 may terminate and closure system 100 may restart new channel detection phase 300 to detect a new channel that is not the primary channel or the detected channel. For example, if primary channel retry counter is greater than five communication retries, then new channel detection phase 300 may restart on a new detected channel. However, as shown in step 316, if primary channel retry counter is less than the predetermined number of communication retries, then new channel detection phase 300 may terminate, and receiver 106 and transmitter 108 may continue communicating on the primary channel of wireless network 116. For example, if primary channel retry counter is less than five communication retries, then new channel detection phase 300 may terminate, and receiver 106 and transmitter 108 may continue communicating on primary channel of wireless network 116.

In one embodiment, closure system 100 may include a method of sealing an opening 114 comprising curtain 102 configured to seal opening 114. Curtain 102 may be controlled by operator 104, which may be coupled to receiver 106. Receiver 106 may be configured to communicate with transmitter 108 on wireless network 116 having at least a first channel and a second channel. The method may include receiver 106 receiving a first signal from transmitter 108 on the first channel. Receiver 106 may then switch from the first channel to the second channel when a wireless interference is detected by receiver 106 on the first channel. In determining whether to switch from the first channel to the second channel, receiver 106 may determine a number of first communication retries associated with the first channel and a number of second communication retries associated with the second channel. Receiver 106 may compare the number of first communication retries with the number of second communication retries and communicate with transmitter 108 on the second channel if the number of first communication retries is greater than the number of second communication retries by a predetermined amount of retries. The predetermined amount of retries may be three, four, five, ten, greater than five, or less than ten. In a preferred embodiment, the predetermined amount of errors is greater than five retries. Receiver 106 may then receive a second signal from transmitter 108 on the second channel. Receiver 106 may transmit a signal to operator 104 to move curtain 102 based on the second signal.

Figure 4:
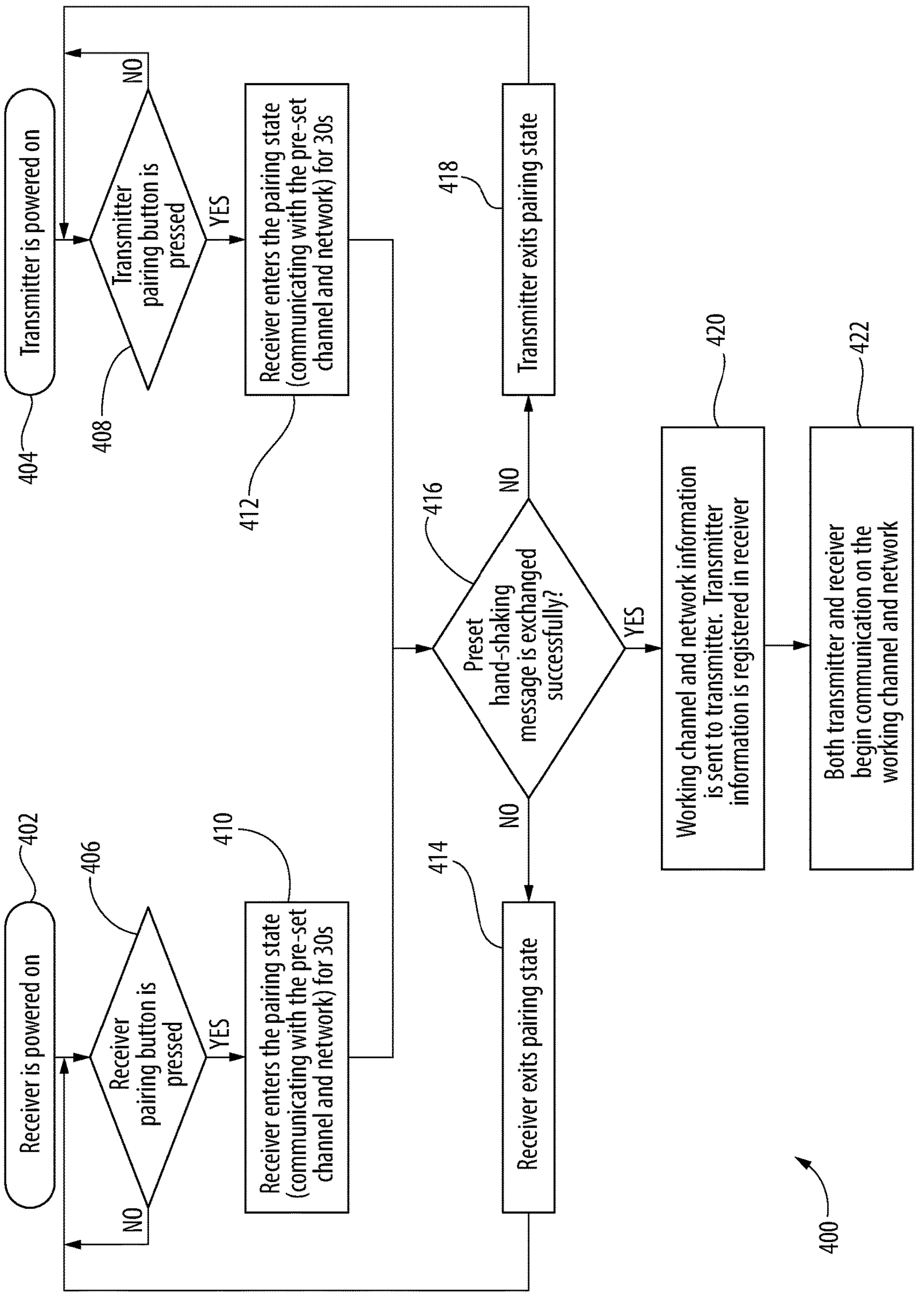
FIG. 4 illustrates an exemplary flow chart representing a method for pairing a transmitter and a receiver in accordance with an exemplary embodiment of the present invention.

FIG. 4 illustrates a flow diagram of an exemplary pairing method 400 of receiver 106 with transmitter 108. Pairing method 400 may allow for pairing between receiver 106 and transmitter 108 by enabling receiver 106 and transmitter 108 to be on the same preset channel, thereby enabling communication between receiver 106 and transmitter 108. As shown in step 406 and 408, exemplary pairing method 400 requires that the pairing button of both receiver 106 and transmitter 108 by pushed. However, compared to traditional methods, the sequence of pushing the pairing buttons receiver 106 and transmitter 108 does not matter. As shown in step 402, receiver 106 is powered on, and in step 406 the pairing button of receiver 106 is pressed. In step 410, once the pairing button of receiver 106 is pressed, receiver 106 may enter a pairing state for a predetermined amount of time. The predetermined amount of time may be from approximately 5 seconds to approximately 60 seconds, from approximately 10 seconds to approximately 45 seconds, or from approximately 15 seconds to approximately 30 seconds. In a preferred embodiment, the predetermined amount of time is approximately 30 seconds.

As shown in steps 404, transmitter 108 is powered on, and in step 408 the pairing button of transmitter 108 is pressed. In step 412, once the pairing button of transmitter 108 is pressed, transmitter 108 may enter a pairing state for a predetermined amount of time. The predetermined amount of time may be from approximately 5 seconds to approximately 60 seconds, from approximately 10 seconds to approximately 45 seconds, or from approximately 15 seconds to approximately 30 seconds. In a preferred embodiment, the predetermined amount of time is approximately 30 seconds. As shown in step 416, once both receiver 106 and transmitter 108 are in the pairing state, a preset hand-shaking message may be exchanged between receiver 106 and transmitter 108. In one embodiment, the sequence of steps 406 and 408 does not alter performance. This allows pairing method to be non-sequence dependent. As shown in step 420, if the exchange in step 416 is successful, then working channel and network information is sent from receiver 106 to transmitter 108, and information pertaining to transmitter 108 is thereby registered in receiver 106. In step 422, both receiver 106 and transmitter 108 may begin communicating on the working channel and network based on information sent in step 420. However, if the exchange in step 416 is not successful, then in steps 414 and 416, receiver 106 and transmitter 108 will both exit the pairing state return to steps 406 and 408, respectively.

Figure 5:
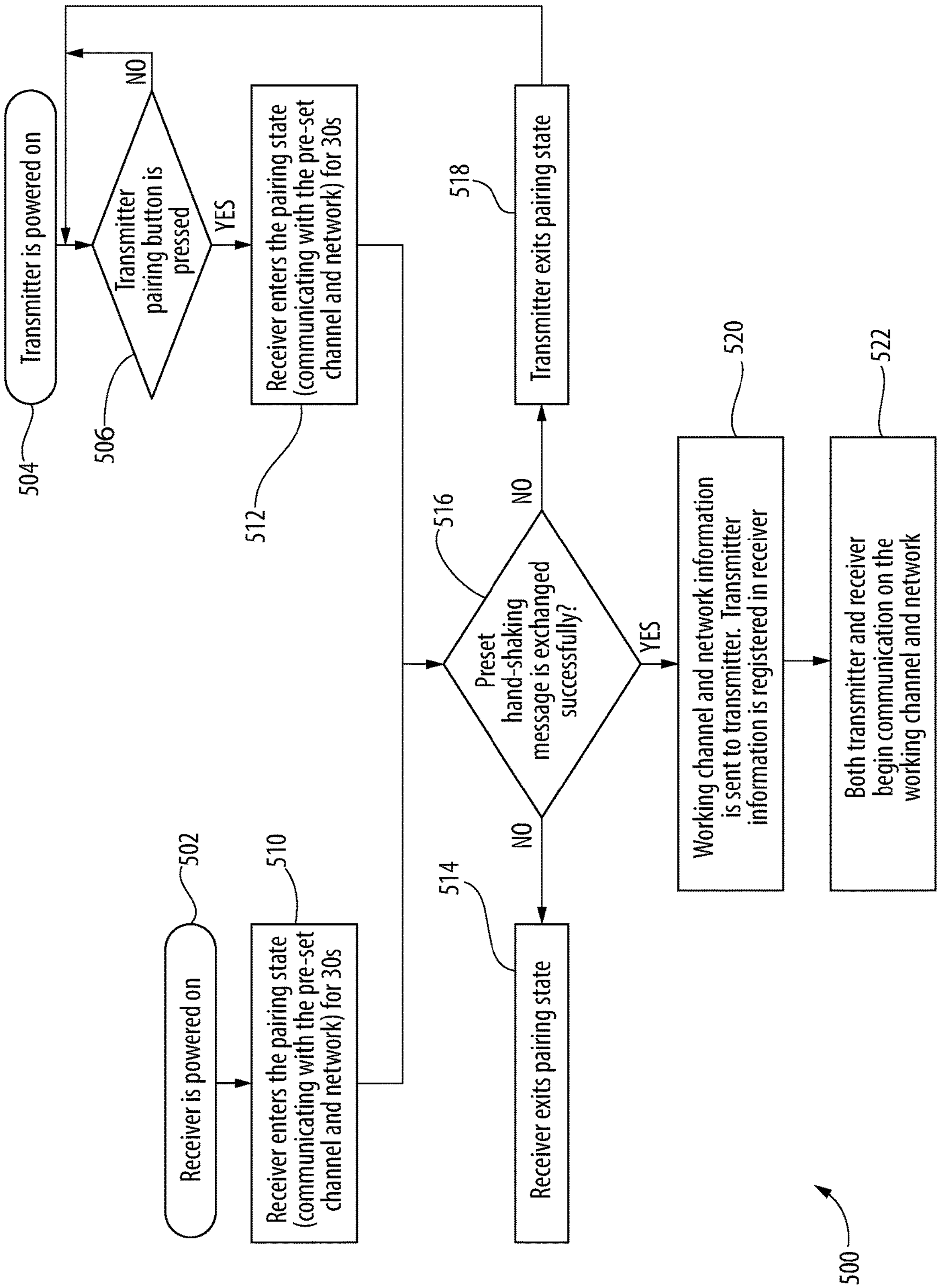
FIG. 5 illustrates an exemplary flow chart representing a method for pairing a transmitter and a receiver in accordance with an exemplary embodiment of the present invention.

FIG. 5 illustrates a flow diagram of an exemplary pairing method 500 of receiver 106 with transmitter 108. Pairing method 500 allows for the pairing of receiver 106 and transmitter 108 without a user having to press a pairing button on receiver 106. This allows a user to pair transmitter 108 with receiver 106 when receiver 106 is located a non-easily accessible area. As shown in step 502, receiver 106 is powered on, and in step 510 receiver 106 may automatically enter a pairing state for a predetermined amount of time upon powering on. The predetermined amount of time may be from approximately 5 seconds to approximately 60 seconds, from approximately 10 seconds to approximately 45 seconds, or from approximately 15 seconds to approximately 30 seconds. In a preferred embodiment, the predetermined amount of time is approximately 30 seconds. As shown in steps 504, transmitter 108 is powered on, and in step 506 the pairing button of transmitter 108 is pressed. In step 512, once the pairing button of transmitter 108 is pressed, transmitter 108 may enter a pairing state for a predetermined amount of time. The predetermined amount of time may be from approximately 5 seconds to approximately 60 seconds, from approximately 10 seconds to approximately 45 seconds, or from approximately 15 seconds to approximately 30 seconds. In a preferred embodiment, the predetermined amount of time is approximately 30 seconds.

As shown in step 516, once both receiver 106 and transmitter 108 are in the pairing state, a preset hand-shaking message may be exchanged between receiver 106 and transmitter 108. If the exchange in step 516 is successful, then in step 520 working channel and network information is sent from receiver 106 to transmitter 108, and information pertaining to transmitter 108 is thereby registered in receiver 106. In step 522, both receiver 106 and transmitter 108 may begin communicating on the working channel and network based on information sent in step 520. However, if the exchange in step 516 is not successful, then in steps 514 and 516, receiver 106 and transmitter 108 will both exit the pairing state return to steps 502 and 506, respectively.

Figure 6:
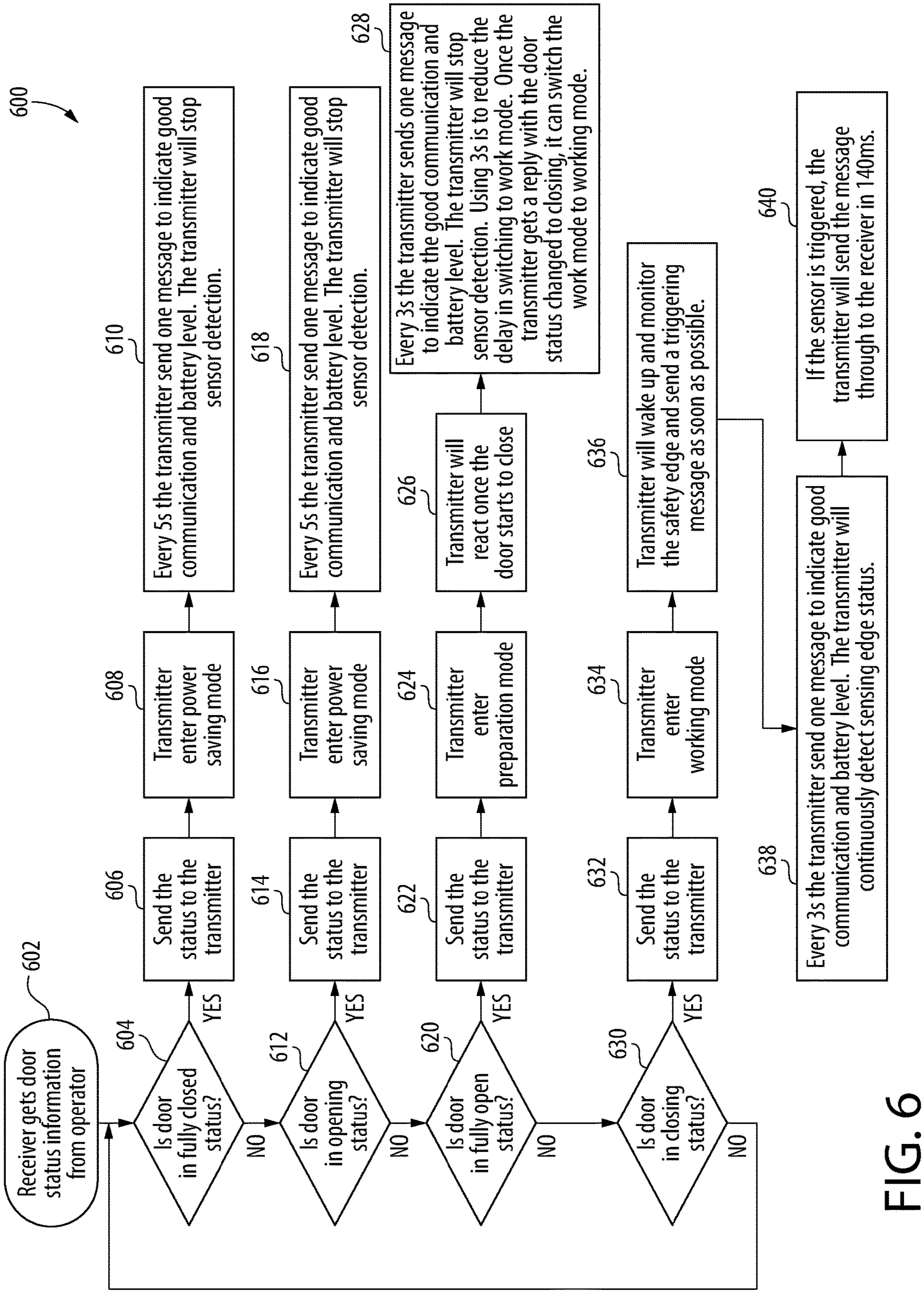
FIG. 6 illustrates an exemplary flow chart representing a method for receiving the status of a curtain in accordance with an exemplary embodiment of the present invention.

FIG. 6 illustrates a flow diagram of an exemplary status update method 600 of receiver 106, where receiver 106 receives status information from operator 104 regarding the status of curtain 102 from transmitter 108. Transmitter 108 may be a safety device and may include sensor detection to determine the position and status of curtain 102. For example, transmitter 108 may be a safety device disposed at edge 110 of curtain 102 and may include a sensor to determine the position of curtain 102 and the presence of any obstacles between edge 110 and floor 118. As shown in step 602, receiver 106 may receive status information of curtain 102 from operator 104. In step 604, receiver 106 may receive information regarding whether curtain 102 is in a closed status. If curtain 102 is in a closed status, then in step 606 the status may be sent to transmitter 108. In step 608, transmitter 108 may enter a power saving mode. In step 610 transmitter 108 may transmit a message at a predetermined interval indicating the battery level and communication status of transmitter level. The predetermined interval may be from approximately 0 seconds to approximately 60 seconds, from approximately 15 seconds to approximately 45 seconds, or from approximately 25 seconds to approximately 35 seconds. In a preferred embodiment, the predetermined interval is 5 seconds. Further, in step 610 transmitter 108 may terminate the sensor detection capability of transmitter 108 in order to preserve the life of the battery. If curtain 102 is not in a closed status, then in step 612, receiver 106 may receive information regarding whether curtain 102 is in an opening status. If curtain 102 is in an opening status, then in step 614 the status may be sent to transmitter 108. In step 616, transmitter 108 may enter a power saving mode. In step 618 transmitter 108 may transmit a message at a predetermined interval indicating the battery level and communication status of transmitter level. The predetermined interval may be from approximately 0 seconds to approximately 60 seconds, from approximately 15 seconds to approximately 45 seconds, or from approximately 25 seconds to approximately 35 seconds. In a preferred embodiment, the predetermined interval is 5 seconds. Further, in step 618 transmitter 108 may terminate the sensor detection capability of transmitter 108 in order to preserve the life of the battery.

In some embodiment, if curtain 102 is not in an opening status, then in step 620, receiver 106 may receive information regarding whether curtain 102 is in an opened status. If curtain 102 is in an opened status, then in step 622 the status may be sent to transmitter 108. In step 624, transmitter 108 may enter into preparation mode. In step 626, transmitter 108 may begin to react and transmit once curtain 102 begins to close. In step 626 transmitter 108 may transmit a message at a predetermined interval indicating the battery level and communication status of transmitter level. The predetermined interval may be from approximately 0 seconds to approximately 60 seconds, from approximately 15 seconds to approximately 45 seconds, or from approximately 25 seconds to approximately 35 seconds. In a preferred embodiment, the predetermined interval is 3 seconds. The predetermined interval may be 3 seconds to reduce the delay of transmitter 108 switching from preparation mode to working mode. Further, in step 626, once transmitter 108 receives a status that curtain 102 is closing, transmitter may switch to a working mode. If curtain 102 is not in an opened status, then in step 630, receiver 106 may receive information regarding whether curtain 102 is in a closing status. If curtain 102 is in a closing status, then in step 632 the status may be sent to transmitter 108. In step 634, transmitter 108 may enter into working mode. In step 636, transmitter 108 may wake up and monitor edge 110 of curtain 102, and send a triggering message as soon as possible. In step 638, transmitter 108 may transmit a message at a predetermined interval indicating the battery level and communication status of transmitter level. The predetermined interval may be from approximately 0 seconds to approximately 60 seconds, from approximately 15 seconds to from approximately 45 seconds, or approximately 25 seconds to approximately 35 seconds. In a preferred embodiment, the predetermined interval is 3 seconds. Further, in step 638, transmitter 108 may continuously detect the status of edge 110. In step 640, if the sensor of transmitter 108 detects an obstacle and is thus triggered, then transmitter 108 will send a message to receiver 106 within a predetermined amount of time. The predetermined amount of time may be from approximately 0 milliseconds to approximately 300 milliseconds, from approximately 50 milliseconds to approximately 250 milliseconds, or from approximately 100 milliseconds to approximately 200 milliseconds. In a preferred embodiment, the predetermined interval is 140 milliseconds. If curtain 102 is not in a closing status, then status update method 600 may return to step 604. Exemplary status update method 600 allows for the use of various power modes for system 100 to ensure adequate power saving capabilities while maintaining safety and efficacy of the safety devices.

Figure 7:
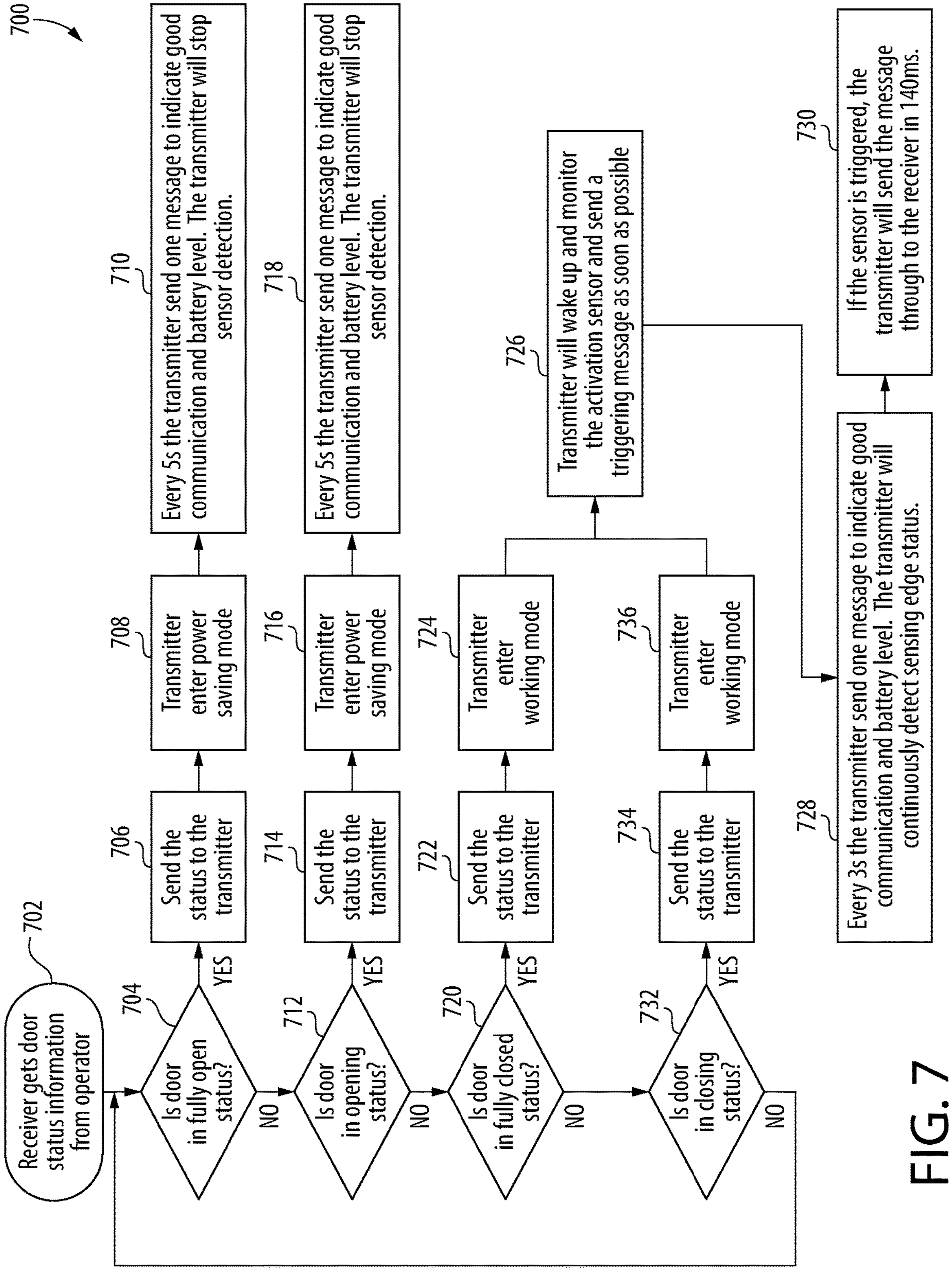
FIG. 7 illustrates an exemplary flow chart representing a method for receiving the status of a curtain in accordance with an exemplary embodiment of the present invention.

FIG. 7 illustrates a flow diagram of an exemplary status update method 700 of receiver 106, where receiver 106 receives status information from operator 104 regarding the status of curtain 102 from transmitter 108. In use, method 700 allows receiver 106 to enter various modes. For example, method 700 may include power saving mode (e.g., step 708), working mode (e.g., step 724), communication modes, and/or pairing mode or state (FIG. 4). In some embodiments, transmitter 108 may be an activation device. As shown in step 702, receiver 106 may receive status information of curtain 102 from operator 104. In step 704, receiver 106 may receive information regarding whether curtain 102 is in a fully open status. If curtain 102 is in a fully open status, then in step 706 the status may be sent to transmitter 108. In step 708, transmitter 108 may enter a power saving mode. In step 710 transmitter 108 may transmit a message at a predetermined interval indicating the battery level and communication status of transmitter 108. The predetermined interval may be from approximately 0 seconds to approximately 60 seconds, from approximately 15 seconds to approximately 45 seconds, or from approximately 25 seconds to approximately 35 seconds. In a preferred embodiment, the predetermined interval is 5 seconds. Further, in step 610 transmitter 108 may terminate the sensor detection capability of transmitter 108 in order to preserve the life of the battery. If curtain 102 is not in a full open status, then in step 712, receiver 106 may receive information regarding whether curtain 102 is in an opening status. If curtain 102 is in an opening status, then in step 714 the status may be sent to transmitter 108. In step 716, transmitter 108 may enter a power saving mode. In step 718 transmitter 108 may transmit a message at a predetermined interval indicating the battery level and communication status of transmitter 108. The predetermined interval may be from approximately 0 seconds to approximately 60 seconds, from approximately 15 seconds to approximately 45 seconds, or from approximately 25 seconds to approximately 35 seconds. In a preferred embodiment, the predetermined interval is 5 seconds. Further, in step 718 transmitter 108 may terminate the sensor detection capability of transmitter 108 in order to preserve the life of the battery.

In some embodiment, if curtain 102 is not in an opening status, then in step 720, receiver 106 may receive information regarding whether curtain 102 is in a fully closed status. If curtain 102 is in a closed status, then in step 722 the status may be sent to transmitter 108. In step 724, transmitter 108 may enter into working mode. In step 726, transmitter 108 may wake up and monitor the activation sensor, and send a triggering message as soon as possible. In step 728, transmitter 108 may transmit a message at a predetermined interval indicating the battery level and communication status of transmitter level. The predetermined interval may be from approximately 0 seconds to approximately 60 seconds, from approximately 15 seconds to from approximately 45 seconds, or approximately 25 seconds to approximately 35 seconds. In a preferred embodiment, the predetermined interval is 3 seconds. Further, in step 728, transmitter 108 may continuously detect the status of edge 110. In step 730, if the sensor of transmitter 108 detects an obstacle and is thus triggered, then transmitter 108 will send a message to receiver 106 within a predetermined amount of time. The predetermined amount of time may be from approximately 0 milliseconds to approximately 300 milliseconds, from approximately 50 milliseconds to approximately 250 milliseconds, or from approximately 100 milliseconds to approximately 200 milliseconds. In a preferred embodiment, the predetermined interval is 140 milliseconds. If curtain 102 is not in a fully closed status, then in step 732, receiver 106 may receive information regarding whether curtain 102 is in a closing status. If curtain 102 is in a closing status, then in step 734 the status may be sent to transmitter 108. In step 736, transmitter 108 may enter into working mode. In step 726, transmitter 108 may wake up and monitor the activation sensor, and send a triggering message as soon as possible. In step 728, transmitter 108 may transmit a message at a predetermined interval indicating the battery level and communication status of transmitter level. The predetermined interval may be from approximately 0 seconds to approximately 60 seconds, from approximately 15 seconds to from approximately 45 seconds, or approximately 25 seconds to approximately 35 seconds. In a preferred embodiment, the predetermined interval is 3 seconds. Further, in step 728, transmitter 108 may continuously detect the status of edge 110. In step 730, if the sensor of transmitter 108 detects an obstacle and is thus triggered, then transmitter 108 will send a message to receiver 106 within a predetermined amount of time. The predetermined amount of time may be from approximately 0 milliseconds to approximately 300 milliseconds, from approximately 50 milliseconds to approximately 250 milliseconds, or from approximately 100 milliseconds to approximately 200 milliseconds. In a preferred embodiment, the predetermined interval is 140 milliseconds. If curtain 102 is not in a closing status, then status update method 700 may return to step 704. Exemplary status update method 700 allows for the use of various power modes for system 100 to ensure adequate power saving capabilities while maintaining safety and efficacy of the activation devices.

Figure 8:
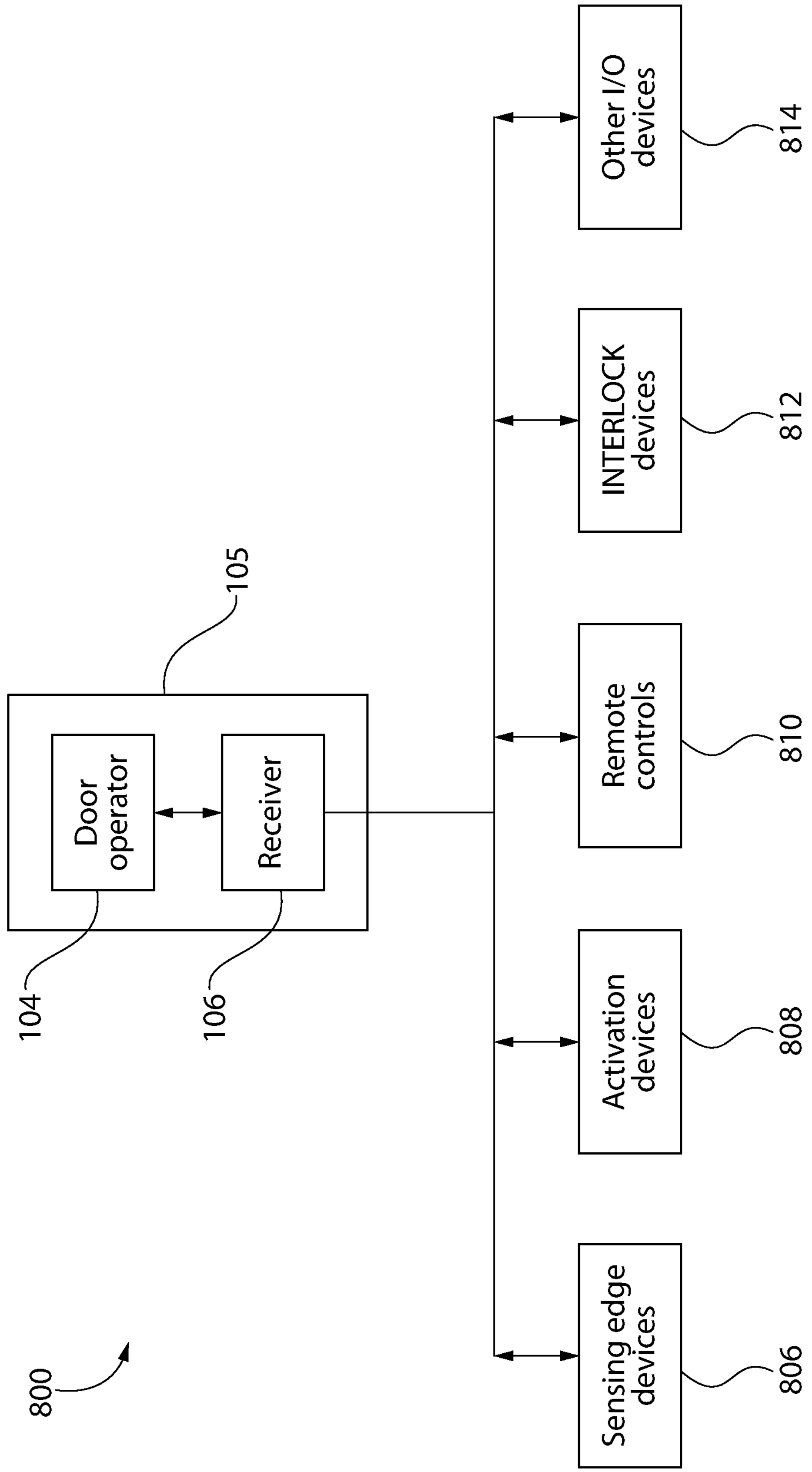
FIG. 8 illustrates an exemplary flow chart representing communication between various elements of a closure system in accordance with an exemplary embodiment of the present invention.

FIG. 8 illustrates an organizational flowchart between various components of closure system 100. As illustrated in FIG. 8, closure system 100 may include various integrated wireless devices such as sensing edge devices 806, activation devices 808, remote controls 810, interlock devices 812, and other I/O devices 814. In some embodiments, I/O devices 814 may include angle sensors, gyro, accelerometer, magnetometer, speedometers, altimeters, clinometers (or other angle sensors), gyroscopes, current sensors, voltage sensors, resistance sensors, radar, active infrared, passive infrared, ultrasonic, radar, microwave, laser, electromagnetic induction, ultra-IR LED, time-of-flight pulse ranging technology, photoelectric eye, thermal imaging, or video analytics. Sensing edge devices 806, activation devices 808, remote controls 810, interlock devices 812, and other I/O devices 814 may be communicatively coupled to receiver 106. In one embodiment, sensing edge devices 806, activation devices 808, remote controls 810, interlock devices 812, and other I/O devices 814 communicate with receiver 106 through wireless network 116. In another embodiment, sensing edge devices 806, activation devices 808, remote controls 810, interlock devices 812, and other I/O devices 814 communicate with receiver 106 via other methods, such as Bluetooth, radio frequency, physical connection, etc. In one embodiment, safety devices such as sensing edge devices 806, may be time critical according UL325 standard. The safety devices may be monitored with high frequency, such as every 3 seconds to 5 seconds. If a connection has failed and alarm may be set off In one embodiment, activation devices 808 may be non-time critical. Activation devices 808 may be monitored with low frequency, such as every 10 seconds to 15 seconds. Receiver 106 and operator 104 may be communicatively coupled to each other. For example, receiver 106 may be configured to allow two-way communication with transmitter 108.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words “proximal”, “distal”, “upper” and “lower” designate directions in the drawings to which reference is made. Unless specifically set forth herein, the terms “a”, “an” and “the” are not limited to one element but instead should be read as meaning “at least one”.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A closure system comprising:

a curtain configured to seal an opening;

a wireless network having a plurality of channels;

at least one transmitter coupled to the curtain and configured to communicate over the plurality of channels; and an operator, the operator operatively coupled to the curtain and communicatively coupled to a receiver, and the receiver configured to communicate over the plurality of channels, the receiver and the at least one transmitter configured to communicate with each other over a selected channel of the plurality of channels based upon communication interference detected on one or more channels, wherein the receiver is configured to switch to the selected channel from a previously selected channel of the plurality of channels after a new channel detection phase detects the selected channel and the communication interference is detected on the previously selected channel.

2. The closure system of claim 1, wherein the curtain is disposed between a first guide rail and a second guide rail.

3. The closure system of claim 1, wherein detection of the communication interference comprises a predetermined amount of communication retries detected on the previously selected channel.

4. The closure system of claim 3, wherein the predetermined amount of communication retries occurs consecutively within a predetermined period of time.

5. The closure system of claim 1, wherein the receiver is configured to receive a plurality of first communication retries associated with communication interference on the previously selected channel and a plurality of second communication retries associated with communication interference on the selected channel.

6. The closure system of claim 5, wherein the receiver is configured to compare the plurality of first communication retries on the previously selected channel with the plurality of second communication retries on the selected channel to detect the communication interference on the previously selected channel.

7. The closure system of claim 6, wherein the receiver and the at least one transmitter determine the selected channel based on the plurality of first communication retries compared to the plurality of second communication retries.

8. The closure system of claim 5, wherein the plurality of first communication retries occurs consecutively within a predetermined period of time.

9. The closure system of claim 1, wherein the at least one transmitter comprises at least one sensor.

10. The closure system of claim 1, wherein the communication interference originates from a wireless device external to the closure system.

11. The closure system of claim 1, wherein the communication interference is a physical object disposed between the receiver and the at least one transmitter.

12. The closure system of claim 1, wherein the communication interference is detected by the receiver.

13. The closure system of claim 1, wherein the operator is configured to control an operation of the curtain.

14. A method of sealing an opening comprising a curtain configured to seal the opening, the curtain controlled by an operator coupled to a receiver, the receiver configured to communicate with at least one transmitter on a wireless network having at least a first channel and a second channel, the method comprising the steps of:

receiving, via the receiver, a first signal from the at least one transmitter on the first channel;

switching, via the receiver, from the first channel to the second channel when a wireless interference is detected by the operator on the first channel, wherein the switching from the first channel to the second channel comprises the steps of:

determining a number of first communication retries associated with the first channel and a number of second communication retries associated with the second channel;

comparing the number of first communication retries with the number of second communication retries; and communicating with the at least one transmitter on the second channel if the number of first communication retries is greater than the number of second communication retries by a predetermined amount of retries;

receiving, via the receiver, a second signal from the at least one transmitter on the second channel; and moving, via the operator, the curtain based on the second signal.

15. The method of claim 14, wherein the predetermined amount of retries is at least five retries.

16. The method of claim 14, wherein the number of first communication retries occurs consecutively within a predetermined period of time.

* * * * *